United States Patent
Chen et al.

(10) Patent No.: US 12,542,244 B2
(45) Date of Patent: Feb. 3, 2026

(54) FLEXIBLE VARIABLE CAPACITOR AND METHOD FOR PREPARATION THEREOF

(71) Applicant: Zhi Neng Rong Dian (Beijing) Technology Co., Ltd, Beijing (CN)

(72) Inventors: Jun Chen, Beijing (CN); Shenghong Yao, Beijing (CN); Xiang Gao, Beijing (CN); Jiamin Zhao, Beijing (CN)

(73) Assignee: Zhi Neng Rong Dian (Beijing) Technology Co., Ltd, Beijing (CN)

( * ) Notice: Subject to any disclaimer, the term of this patent is extended or adjusted under 35 U.S.C. 154(b) by 295 days.

(21) Appl. No.: 18/250,768

(22) PCT Filed: Nov. 3, 2020

(86) PCT No.: PCT/CN2020/126198
§ 371 (c)(1),
(2) Date: Apr. 27, 2023

(87) PCT Pub. No.: WO2022/094767
PCT Pub. Date: May 12, 2022

(65) Prior Publication Data
US 2023/0386754 A1    Nov. 30, 2023

(51) Int. Cl.
*H01G 5/013* (2006.01)
*H01G 5/011* (2006.01)

(52) U.S. Cl.
CPC ........... *H01G 5/0134* (2013.01); *H01G 5/011* (2013.01)

(58) Field of Classification Search
CPC .............................. H01G 5/0134; H01G 5/011
See application file for complete search history.

(56) References Cited

U.S. PATENT DOCUMENTS 5,844,523 A * 12/1998 Brennan ............... H01Q 9/0407
343/846
2003/0017351 A1* 1/2003 Hayashi ................. H01G 4/206
524/413
(Continued)

FOREIGN PATENT DOCUMENTS

CN      102651278          8/2012
CN      106017748 A   * 10/2016 ............. G01L 1/142
(Continued)

OTHER PUBLICATIONS

English Translation of CN 106017748 A (Year: 2016).*
(Continued)

*Primary Examiner* — Timothy J. Dole
(74) *Attorney, Agent, or Firm* — RANKIN, HILL & CLARK LLP; Erik J. Overberger (57) ABSTRACT

Provided are a flexible variable capacitor and method for preparation thereof. The flexible variable capacitor includes two highly conductive flexible electrode layers and an elastomer dielectric insulation layer disposed between the two highly conductive flexible electrode layers, wherein the highly conductive flexible electrode layers include first polymeric elastomer and carbon nanomaterial, and the elastomer dielectric insulation layer includes second polymeric elastomer and functional ceramic nanoparticles. The method for preparation of the flexible variable capacitor is as follows: first, preparing an elastomer composite film with different functions, and then pressing upper and lower electrode layers with the intermediate elastomer insulation layer together to obtain a stretchable strip-shaped plate capacitor. Different from existing technologies, the present application uses independently developed highly conductive flexible electrodes to replace traditional silver oil electrodes, which greatly reduces the cost of variable capacitor devices, and enhances the integration and operability. The prepared
(Continued)

flexible variable capacitor has characteristics such as high dielectric constant, low dielectric loss, simple preparation process, and capacitance being sensitive to deformation.

12 Claims, 5 Drawing Sheets

(56) References Cited

U.S. PATENT DOCUMENTS

| | | | | |
|---|---|---|---|---|
| 2006/0166810 | A1* | 7/2006 | Gunderman | H01G 11/52 361/313 |
| 2009/0073636 | A1* | 3/2009 | Pramanik | H05K 1/162 361/321.5 |
| 2012/0115030 | A1* | 5/2012 | Tanaka | H01M 4/13 428/323 |
| 2018/0029290 | A1 | 2/2018 | Bottiglio et al. | |

FOREIGN PATENT DOCUMENTS

| | | |
|---|---|---|
| CN | 108963330 | 12/2018 |
| CN | 109461597 | 3/2019 |
| CN | 109637821 | 4/2019 |
| CN | 110164704 | 8/2019 |
| CN | 110379642 | 10/2019 |
| CN | 111292874 | 6/2020 |
| CN | 109461597 B | 9/2020 |
| EP | 2905574 A1 | 8/2015 |
| JP | 2009020006 | 1/2009 |
| JP | 2010043880 | 2/2010 |
| JP | 4999031 B1 | 8/2012 |
| JP | 2015189776 | 11/2015 |
| JP | 2016153729 A | 8/2016 |
| JP | 2017034923 A | 2/2017 |
| JP | 2020066723 | 4/2020 |
| KR | 20140101141 | 8/2014 |
| KR | 101729221 | 5/2017 |
| WO | WO 2012/012672 | 1/2012 |
| WO | WO2014050245 | 4/2014 |
| WO | WO2015084139 | 6/2015 |
| WO | WO2017069059 | 4/2017 |
| WO | WO 2017/134653 | 8/2017 |
| WO | WO2020003685 A1 | 1/2020 |

OTHER PUBLICATIONS

Office Action dated Apr. 2, 2024; Application No. JP2023-527241; 4 pg.

Chinese Office Action dated Mar. 11, 2025; Application No. 202080106604.8; 17 pages.

Sarah Aboubakr et al.; (2016) Dielectric characterization of lead zirconate-titane(PZT) /polyurethane(PU) thin film composite: Volume fraction, frequency and temperature dependence, Molecular Crystals and Liquid Crystals, 627:1, 82-91, DOI: 10.1080/15421406. 2015.1137148; 11 pages.

Xing Furbao et al; EPDM—ceramics composite film with high permittivity and low dielectric loss; School of Materials of Tianjin University, Tianjin 300072, China; 4 pages; With English Abstract and cited in Chinese Office Action.

Jin Li-li et al; Review of current research for dielectric elastomer materials; Journal of Mechanical & Electrical Engineering; Jan. 2016; DOI: 10.3969 /j.issn.1001—4551. 2016. 01.003; 7 pages; With English Abstract and cited in Chinese Office Action.

Extended European Search Report dated Dec. 4, 2023; Application No. EP 20960230.9.

* cited by examiner

FLEXIBLE VARIABLE CAPACITOR AND METHOD FOR PREPARATION THEREOF

TECHNICAL FIELD

The present application belongs to the field of electronic components, in particular to a flexible variable capacitor and a method for preparation thereof.

BACKGROUND

With the rapid development of electronic information technology, the replacement speed of digital electronic products has been increasing. The production and sales of consumer electronic products, mainly including flat-panel TVs, laptops, digital cameras, and other products, continue to grow, which promotes the growth of the capacitor industry. Among them, a new mechanical energy capture technology with variable capacitors as its core device is regarded as one of the most promising power generation technologies in the future because of its advantages such as being green and not limited by the environment. Developing efficient electroactive materials is the key to development of the mechanical energy capture technology. Variable capacitors based on dielectric elastomer do not require manual intervention during a service cycle and have ultra-long service life, which can continuously provide power for various autonomous microelectronic devices. Currently, most high-performance and high-quality flexible variable capacitors are based on pure dielectric elastomer, and use silver oil and carbon black dispersion as flexible electrodes, which have poor operability and difficulties in large-scale production. Therefore, there is still a demand for flexible variable capacitors with controllable quality, performance and scalable production.

SUMMARY

For the above disadvantages, the present application provides a flexible variable capacitor, which includes two highly conductive flexible electrode layers and an elastomer dielectric insulation layer disposed between the two highly conductive flexible electrode layers, wherein the highly conductive flexible electrode layers include first polymeric elastomer and carbon nanomaterial, and the elastomer dielectric insulation layer includes second polymeric elastomer and functional ceramic nanoparticles.

In one embodiment, the first polymeric elastomer and the second polymeric elastomer are each independently selected from at least one of thermoplastic polyurethane (TPU), ethylene-propylene-diene monomer (EPDM), and polyester ether-based thermoplastic elastomer (TPEE). The carbon nanomaterial is selected from at least one of carbon nanotubes with a length-to-diameter ratio of 1000, and carbon black, graphene, and carbon nanofibers with a diameter of 100 nm. The functional ceramic nanoparticles are selected from at least one of barium titanate, magnesium titanate, titanium dioxide, zinc oxide, and lead zirconate titanate with a diameter of 100 nm.

In one embodiment, in the highly conductive flexible electrode layers, a mass fraction of the first polymeric elastomer is 85%-90%, and a mass fraction of the carbon nanomaterial is 10%-15%. In the elastomer dielectric insulation layer, a mass fraction of the second polymeric elastomer is 30%-90%, and a mass fraction of the functional ceramic nanoparticles is 10%-70%.

In a preferred implementation, in the elastomer dielectric insulation layer, the mass fraction of the second polymeric elastomer is 50%-70%, and the mass fraction of the functional ceramic nanoparticles is 30%-50%.

The present application also provides a method for preparation of a flexible variable capacitor, including the following steps:

(1) preparing a highly conductive flexible electrode layer comprising first polymeric elastomer and carbon nanomaterial;

(2) preparing an elastomer dielectric insulation layer comprising second polymeric elastomer and functional ceramic nanomaterials;

(3) bonding two highly conductive flexible electrode layers onto both sides of the elastomer dielectric insulation layer respectively;

4) pressing upper and lower highly conductive flexible electrode layers with an intermediate elastomer dielectric insulation layer together through a laminating process.

Preferably, in step 1), the preparing a highly conductive flexible electrode layer includes:

A. adding the carbon nanomaterial and surfactant in a mass ratio of 1:0.8 to 1:1.2 into an organic solvent and performing ultrasonic dispersion for 30-40 minutes, to obtain a carbon nanomaterial suspension, wherein the surfactant is selected from at least one of γ-aminopropyl triethoxy silane (silane coupling agent KH-550, from Kangjin New Materials Technology Co., Ltd.), γ-methylacryloxy propyl trimethoxysilane (silane coupling agent KH-570, from Kangjin New Material Technology Co., Ltd.), and the organic solvent is selected from at least one of N, N-dimethylformamide DMF and tetrahydrofuran THF;

B. adding the first polymeric elastomer into an organic solvent, heating and dissolving to obtain a first polymeric elastomer solution, wherein the organic solvent is selected from DMF and THF;

C. mixing the carbon nanomaterial suspension with the first polymeric elastomer solution evenly to obtain a first polymeric elastomer-carbon nanomaterial composite precursor, wherein a mass ratio of the first polymeric elastomer to the carbon nanomaterial is 85:15 to 90:10;

D. coating the first polymeric elastomer-carbon nanomaterial composite precursor to form a film, and drying it at 75 to 85° C. for 10 to 15 hours, to obtain a highly conductive flexible electrode layer film with a thickness of 15-50 μm.

Preferably, in step 2), the preparing an elastomer dielectric insulation layer includes:

A. mixing the second polymeric elastomer with an organic solvent in a mass ratio of 1:1.8 to 1:2.2, heating and stirring to obtain a solution with a certain viscosity, wherein the organic solvent is selected from DMF and THF;

B. adding a suspension of the functional ceramic nanoparticles and an organic solvent into the obtained solution, and mixing the suspension and the solution evenly to obtain an initial mixture, wherein the organic solvent is selected from DMF and THF, and a mass ratio of the second polymeric elastomer to the functional ceramic nanoparticles is 30:70 to 90:10;

C. mixing the initial mixture to obtain a second polymeric elastomer-functional ceramic nanoparticles composite precursor;

D. coating the second polymeric elastomer-functional ceramic nanoparticles composite precursor to form a film, and drying it to obtain an elastomer dielectric insulation layer film with a thickness of 120-180 μm.

In a preferred implementation, step 4) includes controlling a temperature of a pressing plate of a hot press to 120 to 140° C., a pressure between plates to 0.1 to 0.2 MPa, and a hot pressing time to 60 to 80 seconds, and pressing each of both sides 4-5 times according to the above laminating process until a fully fused plate capacitor is obtained.

In the above technical solution, the mixing of the carbon nanomaterial suspension with the first polymeric elastomer solution can be achieved through an ultrasonic cell crusher or an ultrasonic cell crusher; the initial mixing evenly of the suspension of the functional ceramic nanoparticles and organic solvent can be achieved through high-speed mixer, high-speed blender, and ball mills; the mixing of the second polymeric elastomer and the functional ceramic nanoparticles can be performed through a double roll mixer, a three roll mixer, or a three-high mill; the coating method mentioned in the above solution generally uses a scraping method. The above instruments and methods are not particularly limited, and other instruments and methods that can achieve the application can also be used. In the above technical solution, the temperature for the heating and stirring and the heating and dissolving is 50 to 85 r, but it is not particularly limited as long as the required experimental effect can be achieved. Preferably, during the drying after coating the second polymeric elastomer-functional ceramic nanoparticles composite precursor, it can be dried in a blasting oven and then transferred to a vacuum oven for further drying to prevent the generation of bubbles in the elastomer dielectric insulation layer.

The present application uses highly conductive flexible electrodes to replace traditional silver oil electrodes, which greatly reduces the cost of variable capacitor devices, enhances integration and operability, and provides the possibility for industrial large-scale production.

The flexible variable capacitor described in the present application has the characteristics of high dielectric constant and low dielectric loss, etc. Compared with traditional pure polymer capacitors, the present application selects a elastomer composite film with high dielectric constant as a dielectric layer, and adds functional ceramic nanoparticles into the dielectric elastomer, which improves the dielectric constant and capacitance of the capacitor, while the dielectric loss of the capacitor is kept at a low value.

The flexible variable capacitor described in the present application has excellent performance such as light weight, good flexibility, large capacitance variation, and high cycle stability, etc., which can meet the requirements of most commercial flexible capacitance sensors and energy catcher for variable capacitance.

BRIEF DESCRIPTION OF THE DRAWINGS

In order to more clearly describe the technical solutions of the disclosure and those of the prior art, drawings used in the disclosure and the prior art will be briefly described below. It is obvious that the drawings below are only some of embodiments of the disclosure. Those of ordinary skill in the art can obtain further embodiments based on these drawings.

DESCRIPTION OF REFERENCE SIGNS

1 Highly conductive flexible electrode layer
2 Elastomer dielectric insulation layer
3 Highly conductive flexible electrode layer

DETAILED DESCRIPTION

In order to make objectives, technical solutions and advantages of the present application more apparent, the present application now will be described in detail with reference to the accompanying drawings and the detailed description. Obviously, the embodiments described are only some, and not all, of the embodiments of the present application. All other embodiments obtained by those of ordinary skills in the art based on the embodiments of the present application without any creative efforts are within the scope of protection of the present application.

Embodiment 1

The specific steps for preparation of a highly conductive flexible electrode layer film are as follows:
  adding 0.25 g of carbon nanotubes and 0.25 g of γ-aminopropyl triethoxy silane (KH550, from Kangjin New Material Technology Co., Ltd.) into 49 mL of DMF solvent, and performing ultrasonic dispersion for 30 minutes to obtain a carbon nanotube suspension;
  adding 2 g of thermoplastic polyurethane (TPU) into 8 mL of DMF solvent, heating and dissolving to obtain a polymeric elastomer solution;
  adding the carbon nanotube suspension into the polymeric elastomer solution and mixing the carbon nanotube suspension and the polymeric elastomer for 30 minutes using an ultrasonic cell grinder to obtain a composite precursor of carbon nanotubes and TPU;
  coating the obtained composite precursor of carbon nanotubes and TPU onto a glass plate to form a film and drying it at 80° C. for 12 hours to obtain a highly conductive flexible electrode layer film with a thickness of 30 μm.

The specific steps for preparation of an elastomer dielectric insulation layer thin film are as follows:

mixing 2 g of TPU with 4 mL of organic solvent DMF, and heating its blend to 85° C. under stirring to obtain a TPU solution with a certain viscosity;

coating the obtained TPU solution on a glass plate using a scraper through a coating process, then drying it in a blasting oven at 100° C. for 20 minutes, and then drying it in a vacuum oven at 100° C. for 8 hours to remove residual solvents to finally obtain an elastomer dielectric insulation layer film with a thickness of 150 μm;

The preparation steps of a flexible variable capacitor are as follows:

cutting the highly conductive flexible electrode layer film and the elastomer dielectric insulation layer film, where the dimensions of the highly conductive flexible electrode layer film and the elastomer dielectric insulation layer film are 50 mm in length and 10 mm in width;

superimposing two highly conductive flexible electrode layer films with the elastomer dielectric insulation layer film to ensure no contact between the two electrode films;

pressing the upper and lower highly conductive flexible electrode layer films with the intermediate elastomer dielectric insulation layer film together through the laminating process. The laminating process includes controlling a temperature of a pressing plate of a hot press to 130° C., a pressure between plates to 0.125 MPa, and a hot pressing time to 60 seconds, and pressing each of both sides 4-5 times until a fully fused plate capacitor is obtained.

Embodiment 2

The highly conductive flexible electrode layer film and its preparation method are the same as Embodiment 1. The elastomer dielectric insulation layer film is composed of 90% mass fraction of TPU and 10% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 0.22 g of tetragonal barium titanate nanoparticles with 1.19 mL of DMF to obtain suspension B;

mixing the TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing is controlled to 5 μm and a roll speed is controlled to 108 rpm, to obtain a composite precursor;

coating the obtained composite precursor on a glass plate using a scraper through a coating process, then drying it in a blasting oven at 100° C. for 20 minutes, and then drying it in a vacuum oven at 100° C. for 8 hours to remove residual solvents to finally obtain an elastomer dielectric insulation layer film with a thickness of 155 μm;

The method for preparation of a flexible variable capacitor is the same as Embodiment 1.

Embodiment 3

The highly conductive flexible electrode layer film and its preparation method are the same as Embodiment 1. The elastomer dielectric insulation layer film is composed of 80% mass fraction of TPU and 20% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 0.5 g of tetragonal barium titanate nanoparticles with 1.83 mL of DMF to obtain suspension B;

mixing the obtained TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing is controlled to 5 μm and a roll speed is controlled to 108 rpm, to obtain a composite precursor;

coating the obtained composite precursor on a clean glass plate using a scraper through a coating process, then drying it in a blasting oven at 100° C. for 20 minutes, and then drying it in a vacuum oven at 100° C. for 8 hours to remove residual solvents to finally obtain an elastomer dielectric insulation layer film with a thickness of 148 μm;

The method for preparation of a flexible variable capacitor is the same as Embodiment 1.

Embodiment 4

The highly conductive flexible electrode layer film and its preparation method are the same as Embodiment 1. The elastomer dielectric insulation layer film is composed of 70% mass fraction of TPU and 30% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 0.86 g of tetragonal barium titanate nanoparticles with 2.66 mL of DMF to obtain suspension B;

mixing the TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing is controlled to 5 μm and a roll speed is controlled to 108 rpm, to obtain a composite precursor;

coating the obtained composite precursor on a clean glass plate using a scraper through a coating process, then drying it in a blasting oven at 100° C. for 20 minutes, and then drying it in a vacuum oven at 100° C. for 8 hours to remove residual solvents to finally obtain an elastomer dielectric insulation layer film with a thickness of 152 μm;

The method for preparation of a flexible variable capacitor is the same as Embodiment 1.

Embodiment 5

The highly conductive flexible electrode layer film and its preparation method are the same as Embodiment 1. The elastomer dielectric insulation layer film is composed of 60% mass fraction of TPU and 40% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 1.33 g of tetragonal barium titanate nanoparticles with 3.78 mL of DMF to obtain suspension B;

mixing the TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing is controlled to 5 μm and a roll speed is controlled to 108 rpm, to obtain a composite precursor;

coating the obtained composite precursor on a clean glass plate using a scraper through a coating process, then drying it in a blasting oven at 100° C. for 20 minutes, and then drying it in a vacuum oven at 100° C. for 8 hours to remove residual solvents to finally obtain an elastomer dielectric insulation layer film with a thickness of 150 μm;

The method for preparation of a flexible variable capacitor is the same as Embodiment 1.

Embodiment 6

The highly conductive flexible electrode layer film and its preparation method are the same as Embodiment 1. The elastomer dielectric insulation layer film is composed of 50% mass fraction of TPU and 50% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 2 g of tetragonal barium titanate nanoparticles with 5.33 mL of DMF to obtain suspension B;

mixing the TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing is controlled to 5 μm and a roll speed is controlled to 108 rpm, to obtain a composite precursor;

coating the obtained composite precursor on a clean glass plate using a scraper through a coating process, then drying it in a blasting oven at 100° C. for 20 minutes, and then drying it in a vacuum oven at 100° C. for 8 hours to remove residual solvents to finally obtain an elastomer dielectric insulation layer film with a thickness of 151 μm;

The method for preparation of a flexible variable capacitor is the same as Embodiment 1.

Embodiment 7

The high conductive flexible electrode layer film and its preparation method are the same as Embodiment 1. The elastomer dielectric insulation layer film is composed of 40% mass fraction of TPU and 60% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 3 g of tetragonal barium titanate nanoparticles with 7.67 mL of DMF to obtain suspension B;

mixing the TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing is controlled to 5 μm and a roll speed is controlled to 108 rpm, to obtain a composite precursor;

coating the obtained composite precursor on a clean glass plate using a scraper through a coating process, then drying it in a blasting oven at 100° C. for 20 minutes, and then drying it in a vacuum oven at 100° C. for 8 hours to remove residual solvents to obtain an elastomer dielectric insulation layer film with a thickness of 150 μm;

The method for preparation of a flexible variable capacitor is the same as Embodiment 1.

Embodiment 8

The highly conductive flexible electrode layer film and its preparation method are the same as Embodiment 1. The elastomer dielectric insulation layer film is composed of 30% mass fraction of TPU and 70% mass fraction of barium titanate filler. The elastomer dielectric insulation layer film is prepared by the following steps:

mixing 2 g of TPU with 4 mL of DMF, and heating the blend to 85° C. under stirring to obtain TPU solution A with a certain viscosity;

mixing 4.67 g of tetragonal barium titanate nanoparticles with 11.56 mL of DMF to obtain suspension B;

mixing the TPU solution A with the suspension B, and mixing the TPU solution A and the suspension B evenly for 10 minutes at a speed of 2000 rpm by using a high-speed mixer to obtain an initial mixture;

further mixing the obtained initial mixture on a three roll mixer for 10 minutes, where a roll spacing I controlled to 5 μm and a roll speed is controlled to 108 rpm, to obtain a composite precursor;

coating the obtained composite precursor on a clean glass plate using a scraper through a coating process, then drying it in a blasting oven at 100° C. for 20 minutes, and then drying it in a vacuum oven at 100° C. for 8 hours to remove residual solvents to obtain an elastomer dielectric insulation layer film with a thickness of 154 μm;

The method for preparation of a flexible variable capacitor is the same as Embodiment 1.

Figure 1:
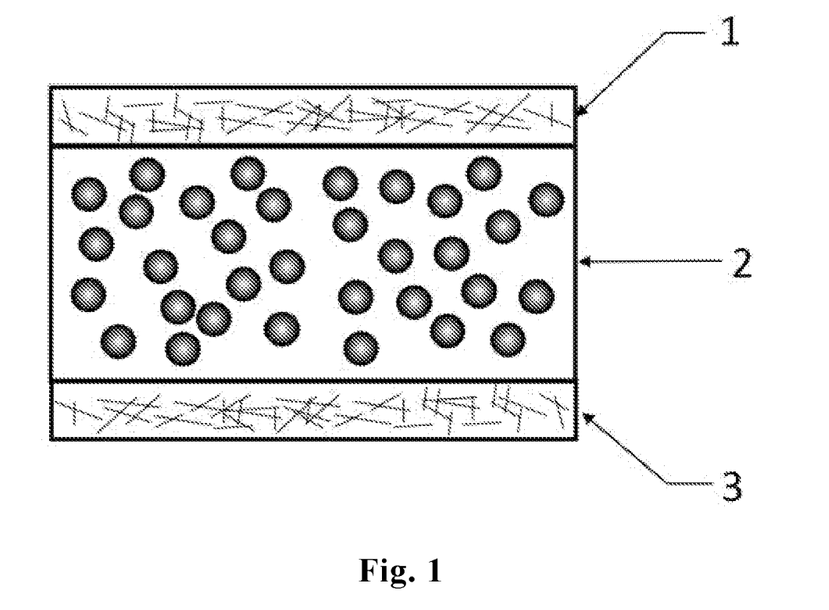
FIG. 1 is a schematic diagram of a variable capacitor.
Figure 2:
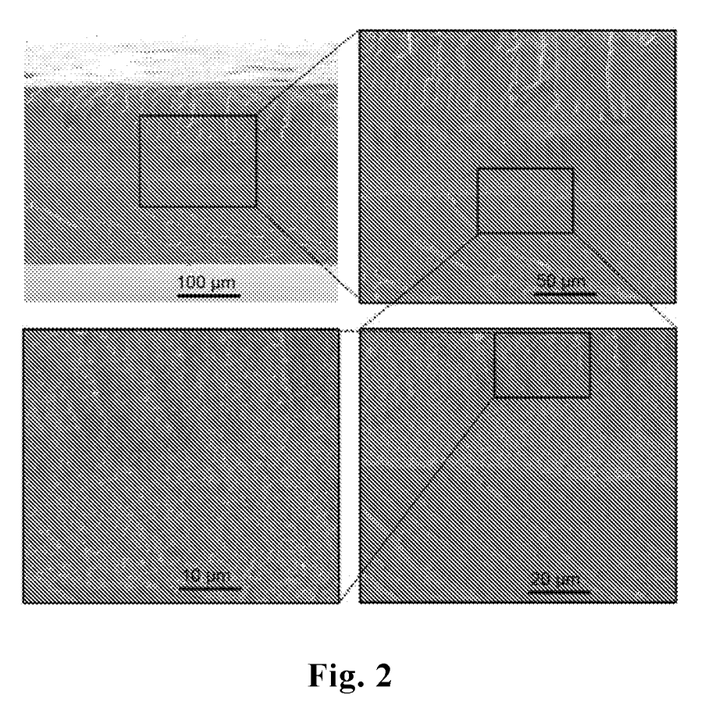
FIG. 2 is scanning electron microscope images of a cross-section of a flexible variable capacitor at different magnifications in embodiment 3 of the present application, wherein upper and lower electrodes are TPU composite material filled with one-dimensional carbon nanotubes, and the intermediate layer is TPU composite material filled with barium titanate nanoparticles.
Figure 3:
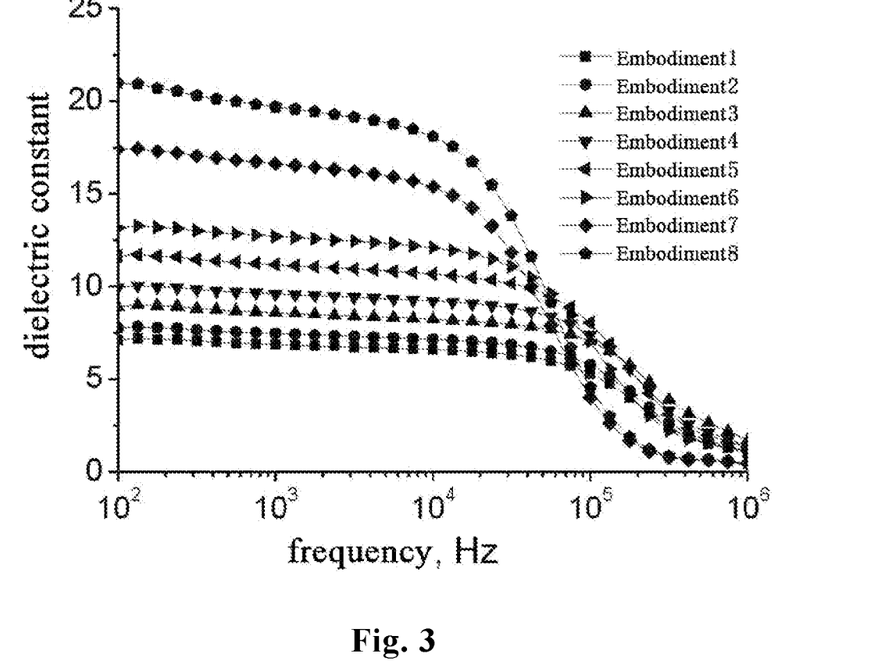
FIG. 3 is a curve of a dielectric constant of the flexible variable capacitor as a function of frequency in embodiments 1-8.
Figure 4:
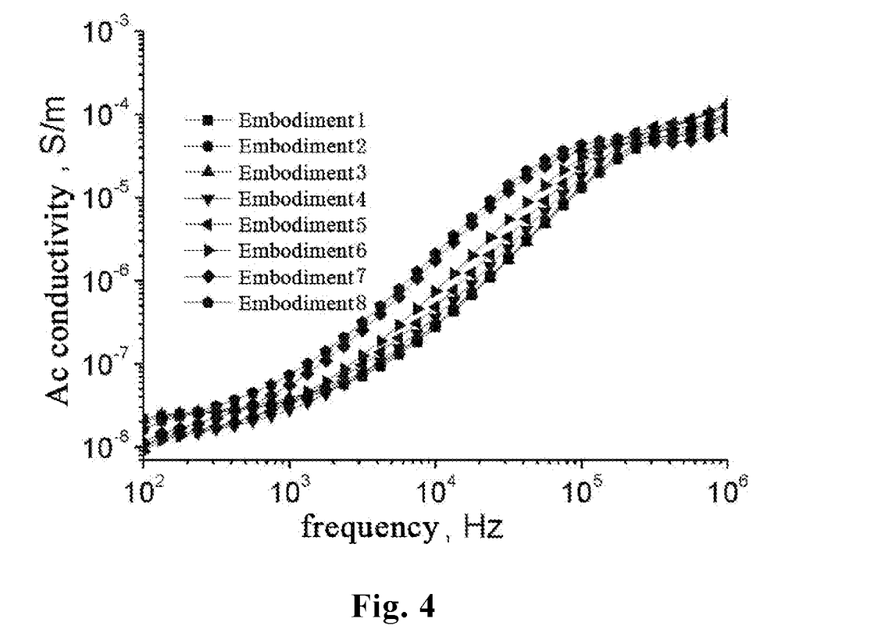
FIG. 4 is a curve of an AC conductivity of the flexible variable capacitor as a function of frequency in embodiments 1-8.
Figure 5:
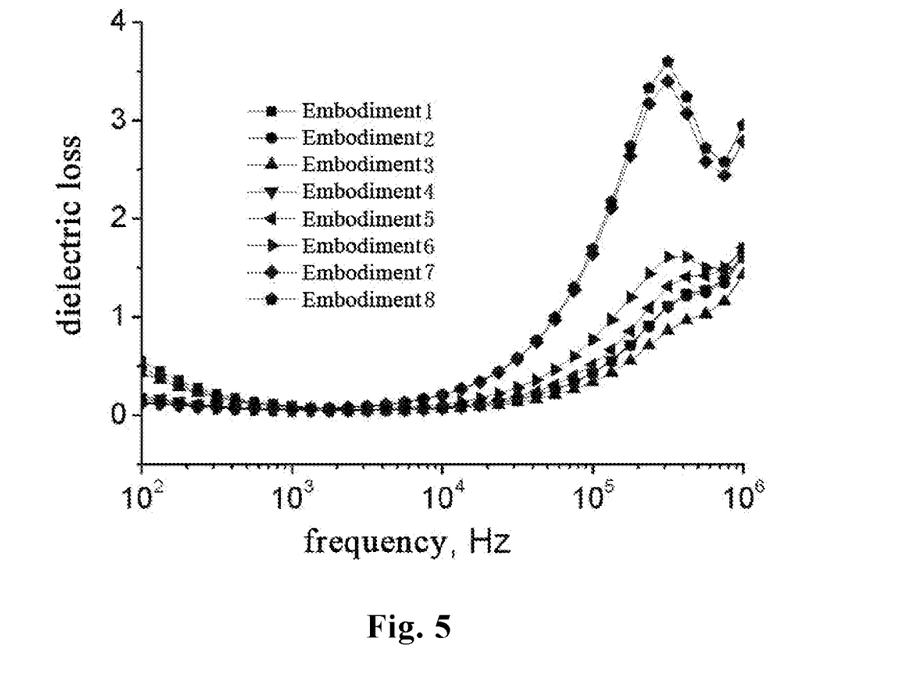
FIG. 5 is a curve of a dielectric loss of the flexible variable capacitor as a function of frequency in embodiments 1-8.
Figure 6:
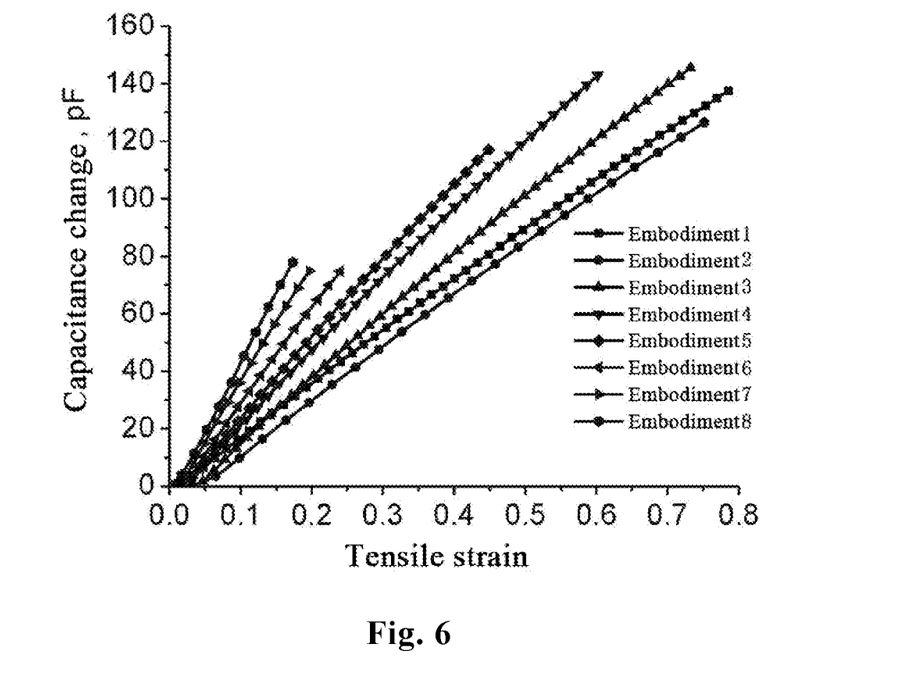
FIG. 6 is a dynamic dielectric test result of the flexible variable capacitor in embodiments 1-8, where an electrode size of the capacitor is 50 mm×10 mm, and a thickness of an intermediate dielectric layer is 150 μm, and the test result is a curve of a capacitance change during tension as a function of a tensile strain.
Figure 7:
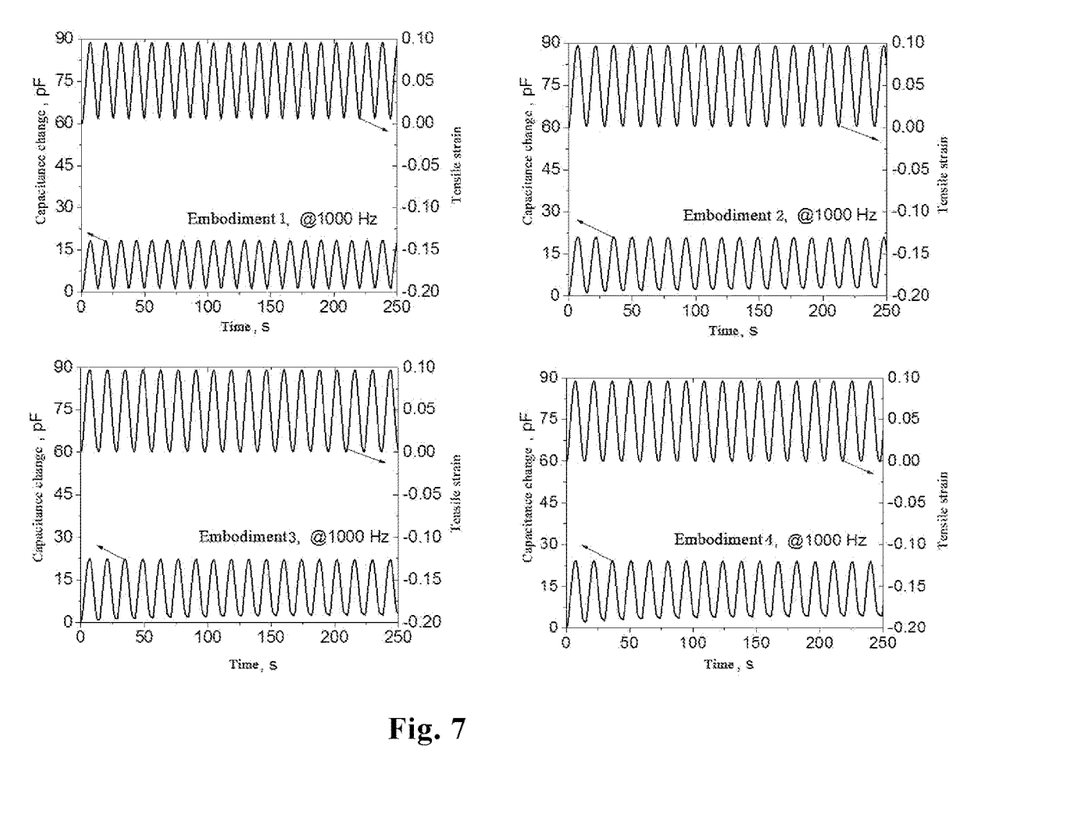
FIG. 7 is a dynamic dielectric test result of the flexible variable capacitor in embodiments 1-8, where a maximum strain of cyclic tension-relaxation is 10%, and the test result is a curve of change in capacitance and strain during loading-unloading over time. Wherein, the electrode size of the capacitor is 50 mm×10 mm, and the thickness of the intermediate dielectric layer is 150 μm.

By characterizing the dielectric properties of the flexible capacitor prepared in the above embodiments, as shown in FIG. 3, the dielectric constant of the capacitor significantly increases with the increase of barium titanate content. At 1000 Hz, as the added amount of barium titanate increases from 0 to 70%, the dielectric constant of the capacitor increases from 6.7 to 19.7. However, it can be seen from FIGS. 4 and 5 that conductivity and dielectric loss of the capacitor are still kept at relatively low values. As shown in FIG. 6, the capacitance of the flexible capacitor prepared in the present application is sensitive to material deformation. When the tensile strain reaches 17%, the capacitance change of the capacitor in Embodiment 8 reaches 78 pF at 1000 Hz. Under the same testing conditions, the capacitance change of traditional pure polymer capacitors with the same size is only 29 pF. Through cyclic tensile testing, it can be seen from FIG. 7 that when the cyclic strain is 10%, the higher the content of ceramic particles, the greater the change in capacitance. A capacitor with 50% filling exhibits excellent comprehensive performances such as light weight, good flexibility, large capacitance change, and high cycling stability.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A method for preparation of a flexible variable capacitor, comprising:
   (1) preparing a highly conductive flexible electrode layer comprising a first polymeric elastomer and a carbon nanomaterial;
   (2) preparing an elastomer dielectric insulation layer comprising a second polymeric elastomer and functional ceramic nanoparticles;
   (3) bonding two highly conductive flexible electrode layers onto both sides of the elastomer dielectric insulation layer respectively;
   (4) pressing upper and lower highly conductive flexible electrode layers with the elastomer dielectric insulation layer together through a laminating process—and
   wherein the preparing the highly conductive flexible electrode layer comprises:
   A. adding the carbon nanomaterial and a surfactant in a mass ratio of 1:0.8 to 1:1.2 into an organic solvent, and performing ultrasonic dispersion for 30 to 40 minutes, to obtain a carbon nanomaterial suspension, wherein the surfactant is selected from at least one of γ-aminopropyl triethoxy silane, γ-methylacryloxy propyl trimethoxysilane, and the organic solvent is selected from at least one of N, N-dimethylformamide DMF and tetrahydrofuran THF;
   B. adding the first polymeric elastomer into a second organic solvent, heating and dissolving to obtain a first polymeric elastomer solution, wherein the second organic solvent is selected from DMF and THF;
   C. mixing the carbon nanomaterial suspension with the first polymeric elastomer solution evenly to obtain a first polymeric elastomer-carbon nanomaterial composite precursor, wherein a mass ratio of the first polymeric elastomer to the carbon nanomaterial is 85:15 to 90:10;
   D. coating the first polymeric elastomer-carbon nanomaterial composite precursor to form a film, drying it at 75 to 85° C. for 10 to 15 hours, to obtain a highly conductive flexible electrode layer film with a thickness of 15 to 50 μm.

2. The method for preparation of the flexible variable capacitor of claim 1, wherein the preparing the elastomer dielectric insulation layer comprises:
   A. mixing the second polymeric elastomer with a third organic solvent in a mass ratio of 1:1.8 to 1:2.2, heating and stirring its blend to obtain a solution with a certain viscosity, wherein the third organic solvent is selected from DMF and THE;
   B. adding a suspension of the functional ceramic nanoparticles and a fourth organic solvent into the obtained solution, and mixing the suspension and the solution evenly to obtain an initial mixture, wherein the fourth organic solvent is selected from DMF and THE, and a mass ratio of the second polymeric elastomer to the functional ceramic nanoparticles is 30:70 to 90:10;
   C. mixing the initial mixture to obtain a second polymeric elastomer-functional ceramic nanoparticles composite precursor;
   D. coating the second polymeric elastomer-functional ceramic nanoparticles composite precursor to form a film, and drying it to obtain an elastomer dielectric insulation layer film with a thickness of 120 to 180 μm.

3. The method for preparation of the flexible variable capacitor of claim 1, wherein an operation in the 4) comprises controlling a temperature of a pressing plate of a hot press to 120 to 140° C., a pressure between plates to 0.1 to 0.2 MPa, and a hot pressing time to 60 to 80 seconds, and pressing each of both sides 4-5 times according to the laminating process until a fully fused plate capacitor is obtained.

4. A flexible variable capacitor prepared according to the method of claim 1, comprising two highly conductive flexible electrode layers and the elastomer dielectric insulation layer disposed between the two highly conductive flexible electrode layers, wherein the highly conductive flexible electrode layers comprise the first polymeric elastomer and carbon nanomaterial, and the elastomer dielectric insulation layer comprises the second polymeric elastomer and functional ceramic nanoparticles, wherein the two highly conductive flexible electrode layers are bonded onto both sides of the elastomer dielectric insulation layer respectively, and the upper and lower highly conductive flexible electrode layers are pressed with the elastomer dielectric insulation layer together through a laminating process.

5. The flexible variable capacitor of claim 4, wherein the first polymeric elastomer and the second polymeric elastomer are each independently selected from at least one of thermoplastic polyurethane TPU, ethylene-propylene-diene monomer EPDM, and polyester ether-based thermoplastic elastomer TPEE; the carbon nanomaterial is selected from at least one of carbon nanotubes with a length-to-diameter ratio of 1000, and carbon black, graphene, and carbon nanofibres with a diameter of 100 nm; and the functional ceramic nanoparticles are selected from at least one of barium titanate, magnesium titanate, titanium dioxide, zinc oxide, and lead zirconate titanate with a diameter of 100 nm.

6. The flexible variable capacitor of claim 4, wherein in the highly conductive flexible electrode layers, a mass fraction of the first polymeric elastomer is 85% to 90%, and a mass fraction of the carbon nanomaterial is 10% to 15%.

7. The flexible variable capacitor of claim 4, wherein in the elastomer dielectric insulation layer, a mass fraction of the second polymeric elastomer is 30% to 90%, and a mass fraction of the functional ceramic nanoparticles is 10% to 70%.

8. The flexible variable capacitor of claim 4, wherein in the elastomer dielectric insulation layer, a mass fraction of the second polymeric elastomer is 50% to 70%, and a mass fraction of the functional ceramic nanoparticles is 30% to 50%.

9. The flexible variable capacitor of claim 4, wherein a dielectric constant of the elastomer dielectric insulation layer is 7.5 to 19.7.

10. The flexible variable capacitor of claim 4, wherein a dielectric loss of the elastomer dielectric insulation layer is 0.02 to 0.06.

11. The flexible variable capacitor of claim 4, wherein a maximum capacity change rate of the flexible variable capacitor is 67%.

12. The flexible variable capacitor of claim 4, wherein a maximum tensile strain of the flexible variable capacitor is 75%.

* * * * *